United States Patent
Higurashi et al.

[11] Patent Number: 5,963,703
[45] Date of Patent: Oct. 5, 1999

[54] METHOD AND APPARATUS FOR RECORDING AND REPRODUCING PACKET DATA

[75] Inventors: Seiji Higurashi, Tokyo; Takeo Ohishi; Mitsuo Harumatsu, both of Yokohama, all of Japan

[73] Assignee: Victor Company of Japan, Ltd., Yokohama, Japan

[21] Appl. No.: 08/820,906

[22] Filed: Mar. 19, 1997

[30] Foreign Application Priority Data

Mar. 19, 1996 [JP] Japan ................................. 8-063396

[51] Int. Cl.⁶ .......................................... H04N 5/91
[52] U.S. Cl. .............................. 386/75; 386/68
[58] Field of Search .................. 386/75, 68, 96, 386/103, 104, 54, 46, 95, 1, 6, 39; H04N 5/91

[56] References Cited

U.S. PATENT DOCUMENTS

| | | | |
|---|---|---|---|
| 5,625,740 | 4/1997 | Sato et al. | 386/106 |
| 5,724,474 | 3/1998 | Oguro et al. | 386/95 |
| 5,881,204 | 3/1999 | Nishiumi et al. | 386/96 |

FOREIGN PATENT DOCUMENTS

| | | |
|---|---|---|
| 0488373 | 6/1992 | European Pat. Off. . |
| 0650296 | 4/1995 | European Pat. Off. . |
| 4101022 | 7/1992 | Germany . |
| 1-248775 | 4/1989 | Japan . |

*Primary Examiner*—Robert Chevalier
*Attorney, Agent, or Firm*—Pollock, Vande Sande & Amernick

[57] ABSTRACT

Audio packets are separated from an input stream of packets including audio packets and video packets. The audio packets relate to audio information. The video packets relate to video information. The video packets are separated from the input stream of packets. The separated audio packets are recorded on first tracks among an array of tracks on a recording medium. The first tracks are spaced by equal intervals corresponding to a given number of tracks. The separated video packets are recorded on second tracks among the array of tracks on the recording medium. The second tracks differ from the first tracks. The first tracks are scanned, and the audio packets are reproduced from the first tracks during high-speed playback. An output stream of packets is generated in response to the reproduced audio packets during the high-speed playback.

7 Claims, 8 Drawing Sheets

METHOD AND APPARATUS FOR RECORDING AND REPRODUCING PACKET DATA

BACKGROUND OF THE INVENTION

1. Field of the Invention

This invention relates to a method of recording and reproducing packet data. This invention also relates to an apparatus for recording and reproducing packet data.

2. Description of the Related Art

Some digital transmission systems such as a digital television broadcasting system send a stream of packets of digital data. Such digital data will be also referred to as packet data hereafter.

It is known to record and reproduce packet data on and from a recording medium. A known recording and reproducing system receives a packet data stream composed of a mixture of video packets related to a video signal and audio packets related to an audio signal. The known system records the video packets and the audio packets on a recording medium in a sequence equal to the sequence of the reception of the packets. The known system reproduces the video packets and the audio packets from the recording medium in a sequence equal to the sequence of the reception of the packets.

An example of the known recording and reproducing system is a helical-scan VTR (video tape recorder). During a high-speed playback mode (a search mode) of operation of the helical-scan VTR, video information is partially recovered from recorded video packets. In this case, it is not intended that audio information should be reproduced.

SUMMARY OF THE INVENTION

It is a first object of this invention to provide an improved method of recording and reproducing packet data.

It is a second object of this invention to provide an improved apparatus for recording and reproducing packet data.

A first aspect of this invention provides a method comprising the steps of separating audio packets from an input stream of packets including audio packets and video packets, the audio packets relating to audio information, the video packets relating to video information; separating the video packets from the input stream of packets; recording the separated audio packets on first tracks among an array of tracks on a recording medium, the first tracks being spaced by equal intervals corresponding to a given number of tracks; recording the separated video packets on second tracks among the array of tracks on the recording medium, the second tracks differing from the first tracks; scanning the first tracks and reproducing the audio packets from the first tracks during high-speed playback; and generating an output stream of packets in response to the reproduced audio packets during the high-speed playback.

A second aspect of this invention provides a method comprising the steps of separating audio packets from an input stream of packets including audio packets and video packets, the audio packets relating to audio information, the video packets relating to video information; recording the separated audio packets on first areas of a recording medium; recording the input stream of packets including the audio packets and the video packets on second areas of the recording medium, the second areas alternating with the first areas; scanning the second areas and reproducing the audio packets and the video packets from the second areas during normal-speed playback; generating an output stream of packets in response to the audio packets and the video packets reproduced from the second areas during the normal-speed playback; scanning the first areas and reproducing the audio packets from the first areas during high-speed playback; and generating an output stream of packets in response to the audio packets reproduced from the first areas during the high-speed playback.

A third aspect of this invention is based on the second aspect thereof, and provides a method wherein the audio packets recorded on the first areas include audio data resulting from thinning out original audio data at a rate depending on a reproduction speed provided by the high-speed playback.

A fourth aspect of this invention is based on the second aspect thereof, and provides a method wherein the audio packets recorded on the first areas include audio data resulting from decoding original audio packets into decoding-resultant audio packets and then encoding the decoding-resultant audio packets into a version suited for the high-speed playback.

A fifth aspect of this invention is based on the first aspect thereof, and provides a method wherein the output-stream generating step comprises thinning out the reproduced audio packets into thinning-resultant audio packets at a rate depending on a reproduction speed provided by the high-speed playback; and generating the output stream of packets in response to the thinning-resultant audio packets during the high-speed playback.

A sixth aspect of this invention provides a recording and reproducing apparatus comprising first means for separating audio packets from an input stream of packets including audio packets and video packets, the audio packets relating to audio information, the video packets relating to video information; second means for separating the video packets from the input stream of packets; third means for recording the audio packets separated by the first means on first tracks among an array of tracks on a recording medium, the first tracks being separated by equal intervals corresponding to a given number of tracks; fourth means for recording the video packets separated by the second means on second tracks among the array of tracks on the recording medium, the second tracks differing from the first tracks; fifth means for scanning the first tracks and reproducing the audio packets from the first tracks during high-speed playback; and sixth means for generating an output stream of packets in response to the audio packets reproduced by the fifth means during the high-speed playback.

A seventh aspect of this invention provides a recording and reproducing apparatus comprising first means for separating audio packets from an input stream of packets including audio packets and video packets, the audio packets relating to audio information, the video packets relating to video information; second means for recording the audio packets separated by the first means on first areas of a recording medium; third means for recording the input stream of packets including the audio packets and the video packets on second areas of the recording medium, the second areas alternating with the first areas; fourth means for scanning the second areas and reproducing the audio packets and the video packets from the second areas during normal-speed playback; fifth means for generating an output stream of packets in response to the audio packets and the video packets reproduced from the second areas by the fourth means during the normal-speed playback; sixth means for scanning the first areas and reproducing the audio packets from the first areas during high-speed playback; and seventh means for generating an output stream of packets in response to the audio packets reproduced from the first areas by the sixth means during the high-speed playback.

DESCRIPTION OF THE PREFERRED EMBODIMENTS

First Embodiment

Figure 1:
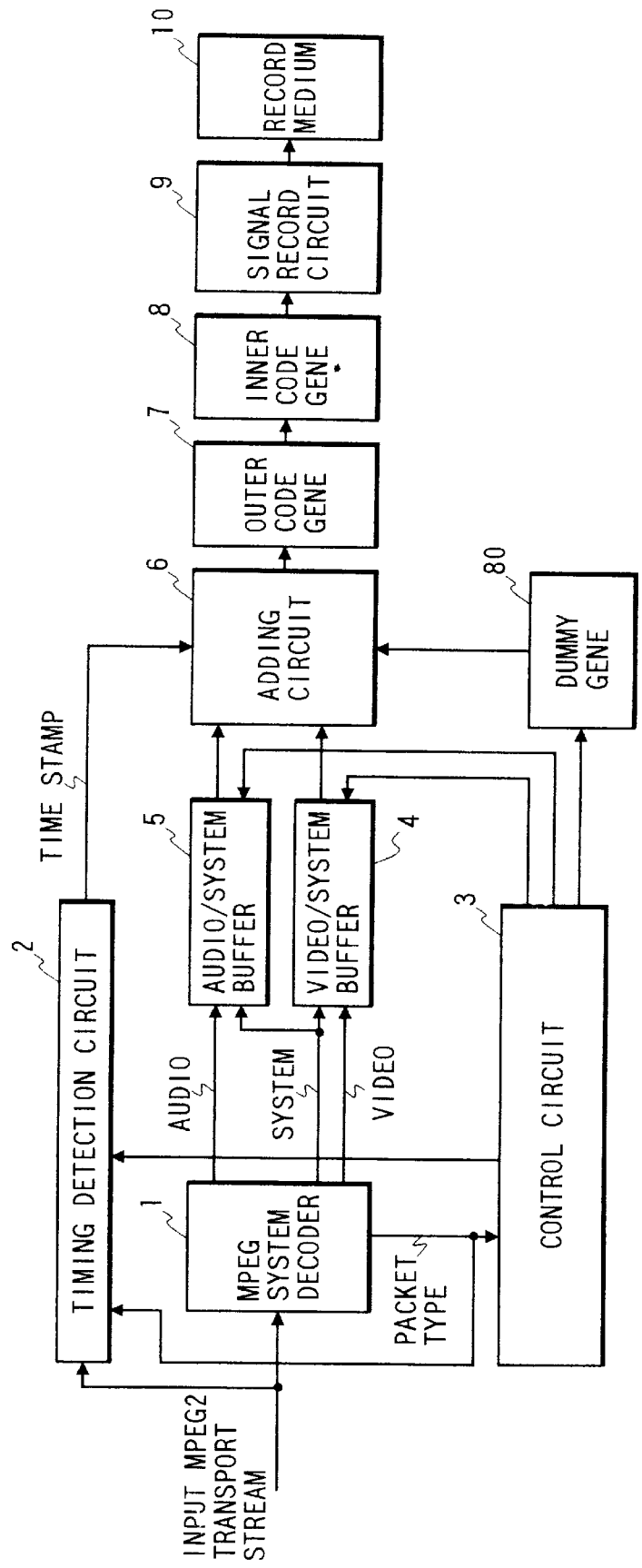
FIG. 1 is a block diagram of a recording side of a digital-signal recording and reproducing system according to a first embodiment of this invention.

FIG. 1 shows a recording side of a digital-signal recording and reproducing system according to a first embodiment of this invention. The recording side in FIG. 1 handles an MPEG2 transport stream of packets of data which include packets of different types such as video packets related to a video signal, audio packets related to an audio signal, and system packets related to system information. Here, MPEG2 is short for "Moving Picture Image Coding Experts Group Phase 2".

With reference to FIG. 1, an input MPEG2 transport stream is applied to an MPEG system decoder 1 and a timing detection circuit 2. A header of each packet in the input MPEG2 transport stream contains packet-type information representing which of a video packet, an audio packet, and a system packet the present packet agrees with. The MPEG system decoder 1 detects which of a video packet, an audio packet, and a system packet each packet in the input MPEG2 transport stream agrees with by referring to packet-type information in the header thereof. The MPEG system decoder 1 separates packets in the input MPEG2 transport stream into video packets, audio packets, and system packets according to results of the detection responsive to the packet-type information. The MPEG system decoder 1 feeds the video packets and the system packets to a buffer (a memory) 4 for video/system, and stores the video packets and the system packets thereinto. The MPEG system decoder 1 feeds the audio packets and the system packets to a buffer (a memory) 5 for audio/system, and stores the audio packets and the system packets thereinto.

As understood from the above explanation, the system packets are stored into both the video/system buffer 4 and the audio/system buffer 5. Thus, the system packets are doubled by cooperation among the MPEG system decoder 1, the video/system buffer 4, and the audio/system buffer 5.

The MPEG system decoder 1 extracts packet-type information from the header of each packet in the input MPEG2 transport stream, and feeds the extracted packet-type information to the timing detection circuit 2 and a control circuit 3.

The timing detection circuit 2 detects information of reference time from the header of each packet in the input MPEG2 transport stream in response to the packet-type information. The timing detection circuit 2 includes a local clock generator outputting a clock signal having a predetermined frequency of, for example, about 27 MHz. The timing detection circuit 2 also includes a counter which serves as a local clock responsive to the clock signal. The output signal of the counter indicates local time which is locked to the reference time by, for example, a PLL circuit. The local time represented by the output signal of the counter is used as a time stamp indicating the moment of the arrival of each packet. Information of the time stamp is selectively outputted from the timing detection circuit 2.

The control circuit 3 includes, for example, a microcomputer or a similar device programmed to implement processes indicated later. The control circuit 3 generates a time-stamp read control signal in response to the packet-type information. The control circuit 3 outputs the time-stamp read control signal to the timing detection circuit 2. Time stamp information is outputted from the the timing detection circuit 2 in response to the time-stamp read control signal. The control circuit 3 generates a pair of a first write control signal and a first read control signal, and a pair of a second write control signal and a second read control signal in response to the packet-type information. The control circuit 3 outputs the pair of the first write control signal and the first read control signal to the video/system buffer 4. The control circuit 3 outputs the pair of the second write control signal and the second read control signal to the audio/system buffer 5.

The writing of video packets and system packets into the video/system buffer 4 is controlled by the first write control signal. The video packets and the system packets are read out from the video/system buffer 4 in response to the first read control signal. The writing of audio packets and system packets into the audio/system buffer 5 is controlled by the second write control signal. The audio packets and the system packets are read out from the audio/system buffer 5 in response to the second read control signal.

The recording side in FIG. 1 forms an array of tracks on a recording medium 10 while recording information thereon. The writing and reading of packets into and from the video/system buffer 4, and the writing and reading of packets into and from the audio/system buffer 5 are designed so that a group of audio packets will be recorded on each of specified tracks (audio/system tracks) spaced at equal track intervals, and video packets will be recorded on other tracks (video/system tracks). In addition, system packets will be recorded on the specified tracks (the audio/system tracks) and also some of the other tracks (the video/system tracks).

The control circuit 3 generates dummy-packet trigger pulses in response to the packet-type information. The control circuit 3 outputs the trigger pulses to a dummy packet generator 80. The dummy packet generator 80 produces and outputs a packet of predetermined dummy data, that is, a dummy packet devoid of effective information, in response to each trigger pulse fed from the control circuit 3. The dummy packet may have predetermined information.

Video packets and system packets read out from the video/system buffer 4 are fed to an adding circuit 6. Audio packets and system packets read out from the audio/system buffer 5 are fed to the adding circuit 6. Time stamp information outputted from the timing detection circuit 2 is fed to the adding circuit 6. Dummy packets outputted from the dummy packet generator 80 are fed to the adding circuit 6. Video packets, audio packets, system packets, and dummy packets are fed to the adding circuit 6 one by one on a time division basis which corresponds to a sequence determined by given rules.

Figure 2:
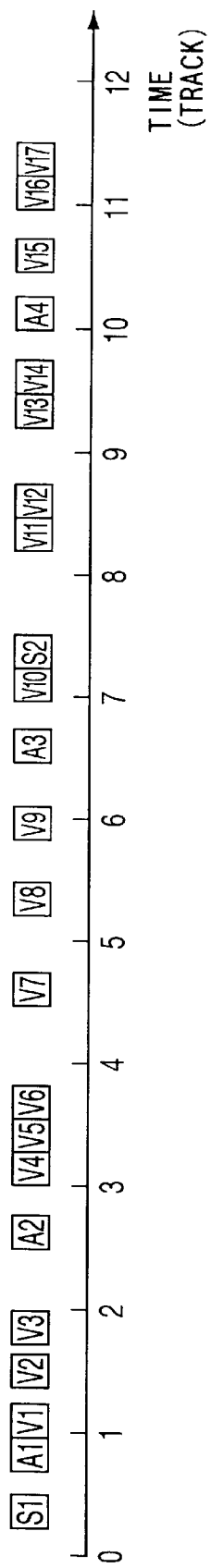
FIG. 2 is a diagram of an example of an input stream of packets.
Figure 3:
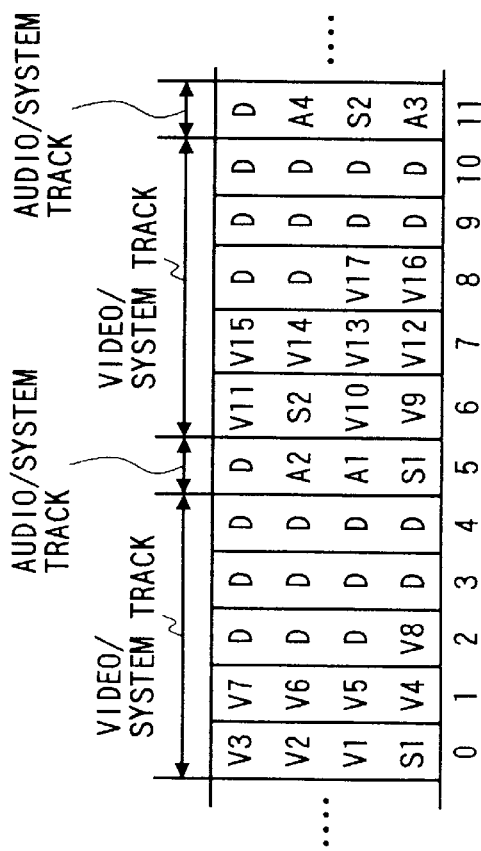
FIG. 3 is a diagram of an example of recorded packets and tracks on a recording medium in the first embodiment of this invention.

It is now assumed that as shown in FIG. 2, the input MPEG2 transport stream has a sequence of packets S1, A1, V1, V2, V3, A2, . . . , where "S", "A", and "V" denote a system packet, an audio packet, and a video packet respectively. In addition, numerals following "S", "A", and "V" indicate order numbers (arrival order numbers) of the corresponding packets. In this case, packets are rearranged from the original sequence by the operation of the MPEG system decoder 1, the video/system buffer 4, and the audio/system buffer 5, and are then recorded on recording-medium tracks "0", "1", "2", . . . in the rearrangement resultant sequence as shown in FIG. 3. In FIG. 3, "D" denotes a dummy packet.

As shown in FIG. 3, preselected places or all places of every track are occupied by 4 recorded packets. In FIG. 3, tracks are separated into groups each having 6 successive tracks. Accordingly, the track groups have a period of 6 tracks. In each track group, 5 former tracks hold video packets and a system packet while a last track holds audio packets and a system packet. Thus, audio packets are recorded on specified tracks (audio/system tracks) spaced by equal intervals of 5 tracks while video packets are recorded on other tracks (video/system tracks) between the specified tracks.

As understood from FIGS. 2 and 3, video packets inputted during every 6-track scanning period are recorded on video/system tracks in a sequence which agrees with a packet arrival sequence. Also, audio tracks inputted during every 6-track scanning period are recorded on an audio/system track in a sequence which agrees with a packet arrival sequence. A system packet inputted during every 6-track scanning period is recorded on a video/system track and also an audio/system track. In each track group, places of video/system tracks are sequentially loaded with a system packet and video packets. The control circuit 3 detects a final packet among the system packet and the video packets in each track group by counting the number of times of the reception of the corresponding packet-type information. The control circuit 3 starts to periodically output a trigger pulse to the dummy packet generator 80 in response to the detection of the final packet. Therefore, in this case, places of the video/system tracks, which follow a place recording the final packet among the system packet and the video packets, are loaded with dummy packets. In each track group, places of an audio/system track are sequentially loaded with a system packet and audio packets. The control circuit 3 detects a final packet among the system packet and the audio packets in each track group by counting the number of times of the reception of the corresponding packet-type information. The control circuit 3 starts to periodically output a trigger pulse to the dummy packet generator 80 in response to the detection of the final packet. Therefore, in this case, places of the audio/system track, which follow a place recording the final packet among the system packet and the audio packets, are loaded with dummy packets.

With reference back to FIG. 1, the adding circuit 6 adds the time stamp information to the header of each of the video packets, the audio packets, and the system packets. The time-stamp-added video, audio, and system packets, and also the dummy packets are outputted from the adding circuit 6 to an outer-code generating circuit 7 one by one.

Header data and main data in successive packets (that is, packet data) fed to the outer-code generating circuit 7 are divided into data blocks also referred to as sync blocks. The outer-code generating circuit 7 generates an error correction code signal (an outer code signal) for every given number of data blocks assigned to one track. The outer-code generating circuit 7 adds the outer code signal to the packet data (the header data and the main data) corresponding to one track. The outer-code generating circuit 7 outputs the resultant combination of the outer code signal and the packet data to an inner-code generating circuit 8.

Figure 4:
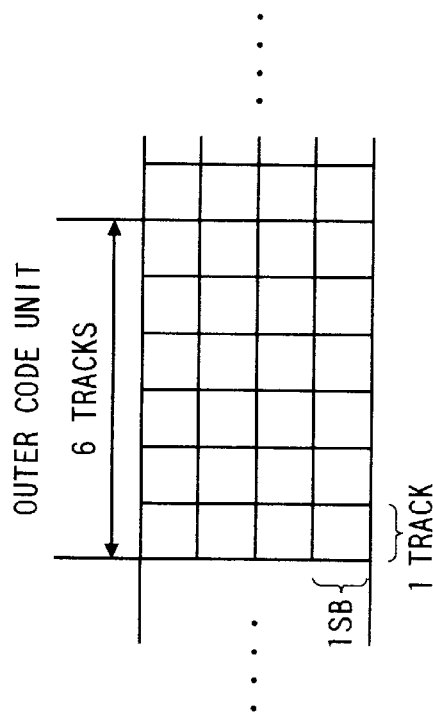
FIG. 4 is a diagram of the relation among a unit for an outer code signal, tracks, and sync blocks in the first embodiment of this invention.

As shown in FIG. 4, the outer code signal corresponding to every 6 tracks forms one unit. In FIG. 4, SB denotes a sync block, hat is, a data block.

In FIG. 1, the inner-code generating circuit 8 generates a parity signal (an inner code signal) in response to every data block or every data unit of the output signal of the outer-code generating circuit 7. The inner-code generating circuit 8 outputs a combination of the packet data (the header data and the main data), the outer code signal, and the inner code signal to a signal recording circuit 9.

The signal recording circuit 9 adds a sync signal and ID information to every data block of the output signal of the inner-code generating circuit 8, and subjects the addition-resultant signal to amplification and modulation for record. The signal recording circuit 9 records the modulation-resultant signal on a recording medium 10.

For example, the recording medium 10 is a magnetic tape. In this case, the signal recording circuit 9 includes a rotary head assembly via which the modulation-resultant signal is recorded on the magnetic tape 10 along slant tracks arranged in an array.

Figure 5:
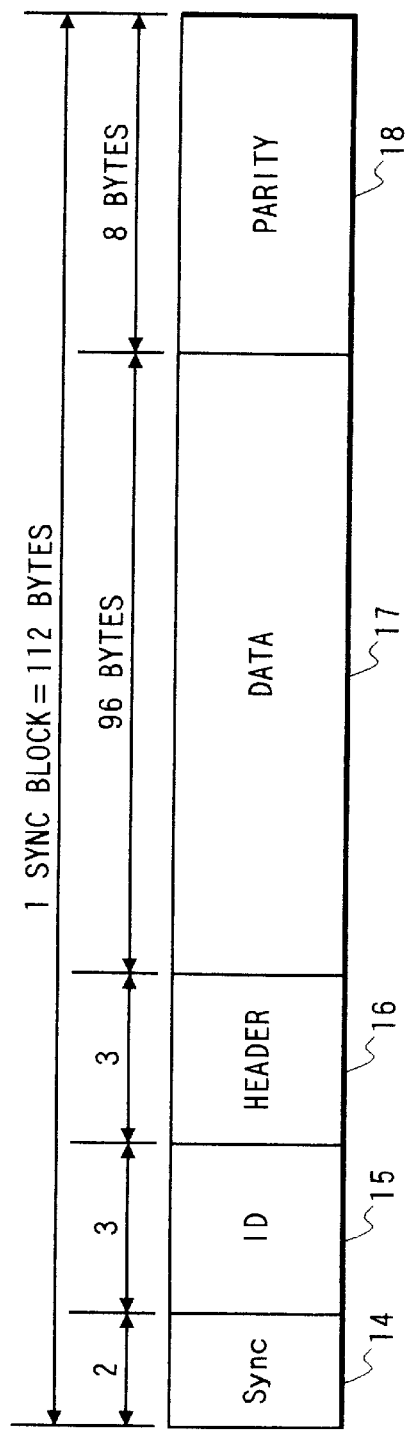
FIG. 5 is a diagram of one sync block.

As shown in FIG. 5, one sync block corresponding to one data block is divided into regions 14, 15, 16, 17, and 18 arranged in that order. One sync block has 112 bytes. The region 14 has 2 bytes.

The region 14 is assigned to a sync signal used for the recovery of the sync block. The region 15 has 3 bytes. The region 15 is assigned to ID information, that is, address information. The region 16 has 3 types. The region 16 is assigned to header information.

The region 17 has 96 bytes. The region 17 is assigned to effective data. The region 17 is referred to as the data region. The region 18 has 8 bytes. The region 18 is assigned to a parity signal (an inner code signal) for error correction of information represented by the sync block.

Figure 6:
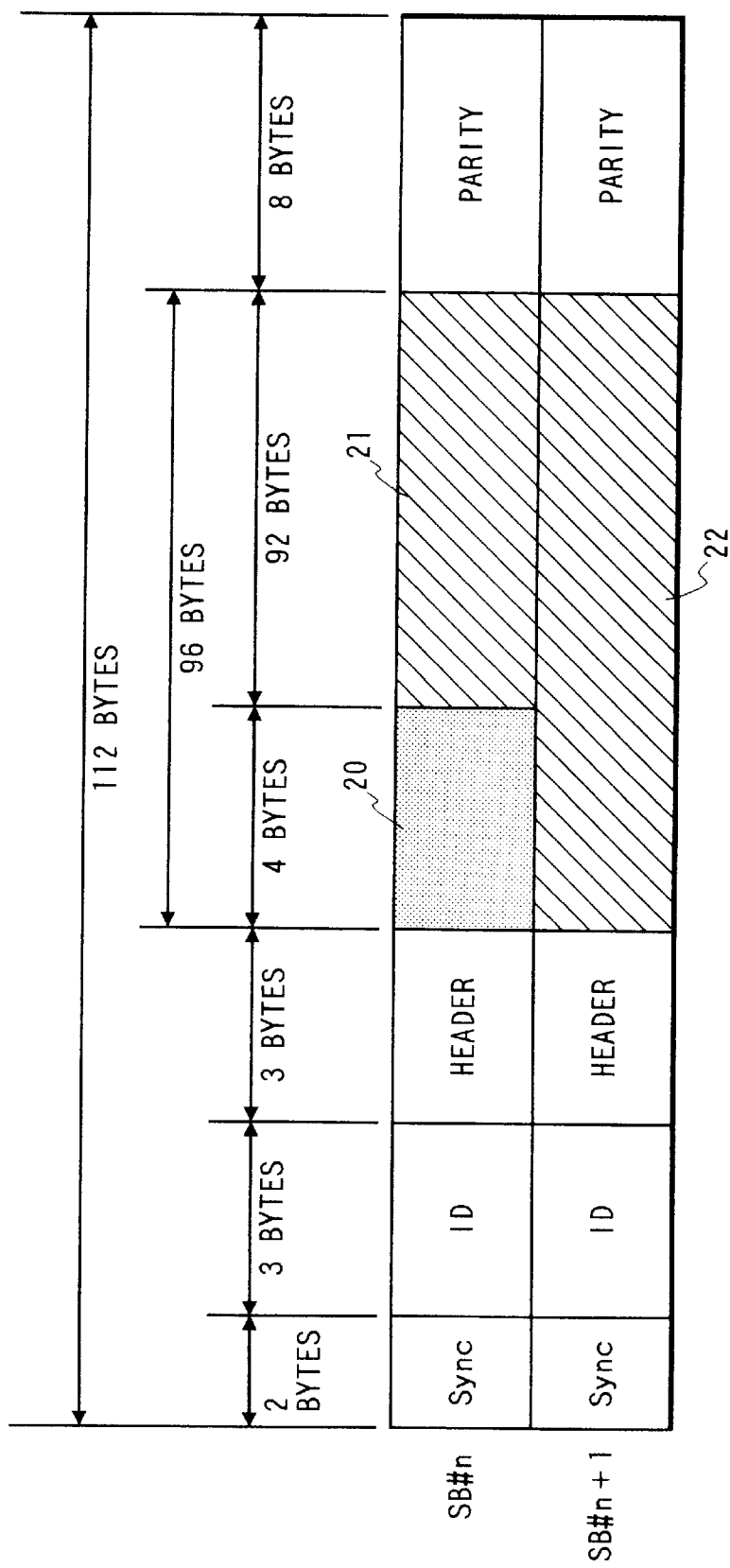
FIG. 6 is a diagram of two successive sync blocks.

Each packet in the input MPEG2 transport stream has 188 bytes. Two successive sync blocks SB#n and SB#n+1 (see FIG. 6) are assigned to one packet in the input MPEG2 transport stream. Specifically, as shown in FIG. 6, the 96-byte data region 17 of the first sync block SB#n is divided into a former 4-byte area 20 and a latter 92-byte area 21. The former area 20 is assigned to added information such as time stamp information. The latter area 21 is assigned to data pieces in the first byte to the ninety-second byte of the packet. The 96-byte data region 17 of the second sync block SB#n+1 is used as a 96-byte area 22 assigned to remaining data pieces in the packet.

Each of video packets, audio packets, system packets, and dummy packets is assigned to two successive sync blocks. Video packets, audio packets, system packets, and dummy packets are assigned to a predetermined number of sync blocks (for example, 306 sync blocks) per track on the recording medium 10. The outer-code signal is assigned to a predetermined number of sync blocks (for example, 30 sync blocks) per track on the recording medium 10. As shown in FIG. 3, audio packets are recorded on specified tracks (audio/system tracks) spaced by equal intervals of 5 tracks. In other words, audio packets are recorded on specified tracks (audio/system tracks) which occur at a period corresponding to 6 tracks.

It should be noted that in the recording side in FIG. 1, delaying signals are implemented in a suitable way to provide matching in operation timing among the circuit parts of the recording side.

Figure 7:
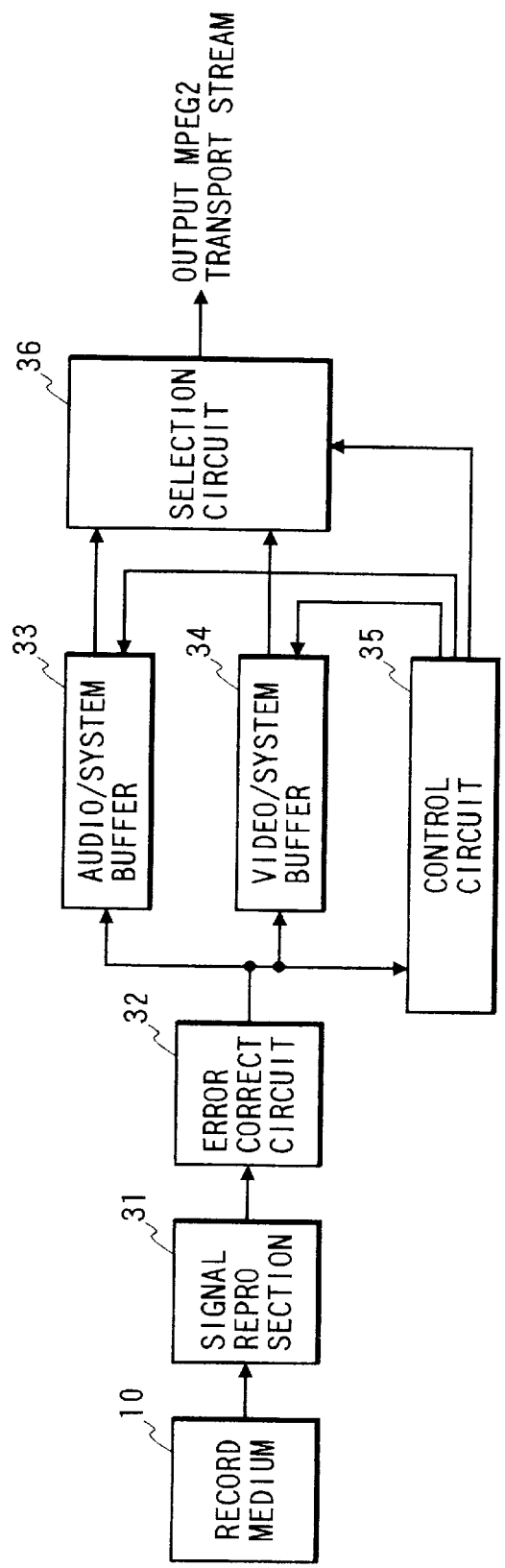
FIG. 7 is a block diagram of a reproducing side of the digital-signal recording and reproducing system according to the first embodiment of this invention.

FIG. 7 shows a reproducing side of the digital-signal recording and reproducing system according to the first embodiment of this invention. With reference to FIG. 7, a signal reproducing section 31 reproduces a digital signal from the recording medium 10. In the case where the recording medium 10 is a magnetic tape, the signal reproducing section 31 includes a rotary head assembly via which the digital signal is reproduced from slant tracks on the magnetic tape 10.

Figure 8:
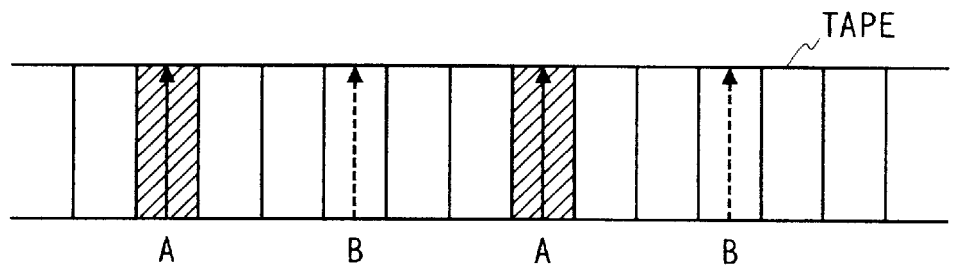
FIG. 8 is a diagram of tracks on a recording medium and trajectories of heads which occur during high-speed playback in the first embodiment of this invention.

Operation of the reproducing side in FIG. 7 can be changed among plural different modes including a normal-speed playback mode and a high-speed playback mode. During the high-speed playback mode of operation of the reproducing side in FIG. 7, the rotary head assembly is changed from a normal state so that as shown in FIG. 8, audio/system tracks "A" and video/system tracks "B" spaced by equal intervals of two tracks can be fully scanned by a head or heads along longitudinal directions of the tracks. In FIG. 8, the arrows denote the trajectories of the head or heads relative to the magnetic tape 10. This scanning is implemented by one of the following techniques. According to a first technique, the axis of rotation of a rotary drum in the rotary head assembly is inclined relative to a normal position. An example of such a technique is disclosed in Japanese published unexamined patent application 8-273255. According to a second technique, a head or heads in the rotary head assembly are vertically displaced by a piezoelectric actuator or piezoelectric actuators in response to an electric signal.

During the high-speed playback mode of operation of the reproducing side in FIG. 7, the digital signal reproduced from the recording medium 10 is subjected to demodulation by the signal reproducing section 31. The demodulation-resultant signal is outputted from the signal reproducing section 31 to an error correction circuit 32. Errors in the output signal of the signal reproducing section 31 are corrected by the error correction circuit 32 in response to an outer code signal and an inner code signal in the output signal of the signal reproducing section 31. The error-correction-resultant signal is outputted from the error correction circuit 32 to a buffer (a memory) 33 for audio/system, a buffer (a memory) 34 for video/system, and a control circuit 35.

The control circuit 35 includes, for example, a microcomputer or a similar device programmed to implement processes indicated later. During the high-speed playback mode of operation of the reproducing side in FIG. 7, the control circuit 35 detects header information and time stamp information in each packet in the output signal of the error correction circuit 32. The control circuit 35 generates a pair of a first write control signal and a first read control signal, and a pair of a second write control signal and a second read control signal in response to the detected header information and the detected time stamp information. The control circuit 35 outputs the pair of the first write control signal and the first read control signal to the audio/system buffer 33. The control circuit 35 outputs the pair of the second write control signal and the second read control signal to the video/system buffer 34. Audio packets and system packets in the output signal of the error correction circuit 32 which have been reproduced from audio/system tracks are written into the audio/system buffer 33 in response to the first write control signal. The audio packets and the system packets are read out from the audio/system buffer 33 in response to the first read control signal. The control of the audio/system buffer 33 by the control circuit 35 is designed so that the audio packets and the system packets will be read out from the audio/system buffer 33 in a sequence accorded with the packet arrival sequence retrieved from the time stamp information. Video packets and system packets in the output signal of the error correction circuit 32 which have been reproduced from scanned video/system tracks are written into the video/system buffer 34 in response to the second write control signal. The video packets and the system packets are read out from the video/system buffer 34 in response to the second read control signal. The control of the video/system buffer 34 by the control circuit 35 is designed so that the video packets and the system packets will be read out from the video/system buffer 34 in a sequence accorded with the packet arrival sequence retrieved from the time stamp information.

During the high-speed playback mode of operation of the reproducing side in FIG. 7, the control circuit 35 inhibits dummy packets from being written into the audio/system buffer 33 and the video/system buffer 34. Furthermore, the control circuit 35 generates a selection control signal in response to the detected header information and the detected time stamp information. The control circuit 35 outputs the selection control signal to a selection circuit 36. Audio packets and system packets read out from the audio/system buffer 33 are fed to the selection circuit 36. Video packets and system packets read out from the video/system buffer 34 are fed to the selection circuit 36. The selection circuit 36 combines the audio packets, the system packets, and the video packets into an output MPEG2 transport stream of packets in response to the selection control signal. In this case, the output MPEG2 transport stream is designed to match with high-speed playback. The output MPEG2 transport stream is transmitted from the selection circuit 36.

During the normal-speed playback mode of operation of the reproducing side in FIG. 7, slant tracks on the recording medium (the magnetic tape) 10 are sequentially scanned by the head or heads. The digital signal reproduced from the recording medium 10 is subjected to demodulation by the signal reproducing section 31. The demodulation-resultant signal is outputted from the signal reproducing section 31 to the error correction circuit 32. Errors in the output signal of the signal reproducing section 31 are corrected by the error correction circuit 32 in response to an outer code signal and an inner code signal in the output signal of the signal reproducing section 31. The error-correction-resultant signal is outputted from the error correction circuit 32 to the audio/system buffer 33, the video/system buffer 34, and the control circuit 35.

During the normal-speed playback mode of operation of the reproducing side in FIG. 7, the control circuit 35 detects header information and time stamp information in each packet in the output signal of the error correction circuit 32. The control circuit 35 generates a pair of a first write control signal and a first read control signal, and a pair of a second write control signal and a second read control signal in response to the detected header information and the detected time stamp information. The control circuit 35 outputs the pair of the first write control signal and the first read control signal to the audio/system buffer 33. The control circuit 35 outputs the pair of the second write control signal and the second read control signal to the video/system buffer 34. Audio packets and system packets in the output signal of the error correction circuit 32 which have been reproduced from audio/system tracks are written into the audio/system buffer 33 in response to the first write control signal. The audio packets and the system packets are read out from the audio/system buffer 33 in response to the first read control signal. The control of the audio/system buffer 33 by the control circuit 35 is designed so that the audio packets and the system packets will be read out from the audio/system buffer 33 in a sequence accorded with the packet arrival sequence retrieved from the time stamp information. Video packets and system packets in the output signal of the error correction circuit 32 which have been reproduced from video/system tracks are written into the video/system buffer 34 in response to the second write control signal. The video packets and the system packets are read out from the video/system buffer 34 in response to the second read control signal. The control of the video/system buffer 34 by the control circuit 35 is designed so that the video packets and the system packets will be read out from the video/system buffer 34 in a sequence accorded with the packet arrival sequence retrieved from the time stamp information.

During the normal-speed playback mode of operation of the reproducing side in FIG. 7, the control circuit 35 generates a selection control signal in response to the detected header information and the detected time stamp information. The control circuit 35 outputs the selection control signal to the selection circuit 36. Audio packets and system packets read out from the audio/system buffer 33 are fed to the selection circuit 36. Video packets and system packets read out from the video/system buffer 34 are fed to the selection circuit 36. The selection circuit 36 halves the system packets and arranges the audio packets, the system packets, and the video packets in an original sequence in response to the selection control signal, thereby providing an output MPEG2 transport stream of packets. In this case, the output MPEG2 transport stream is designed to match with normal-speed playback. The output MPEG2 transport stream is transmitted from the selection circuit 36.

It should be noted that in the reproducing side in FIG. 7, delaying signals are implemented in a suitable way to provide matching in operation timing among the circuit parts of the reproducing side.

Second Embodiment

Figure 9:
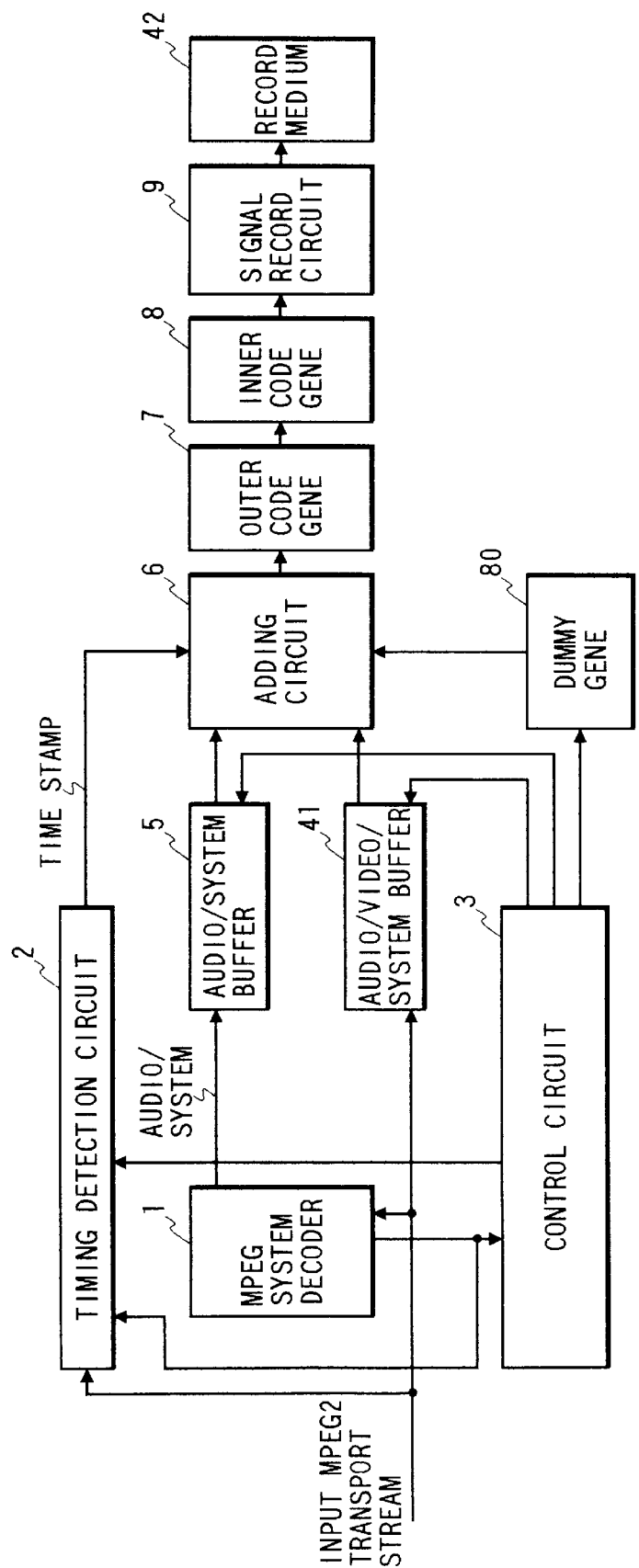
FIG. 9 is a block diagram of a recording side of a digital-signal recording and reproducing system according to a second embodiment of this invention.

FIG. 9 shows a recording side of a digital-signal recording and reproducing system according to a second embodiment of this invention. The recording side in FIG. 9 is similar to the recording side in FIG. 1 except for design changes indicated later.

The recording side in FIG. 9 includes an audio/video/system buffer (an audio/video/system memory) 41 instead of the video/system buffer 4 in FIG. 1. An input MPEG2 transport stream is applied to the audio/video/system buffer 41 in addition to an MPEG system decoder 1 and a timing detection circuit 2. All packets in the input MPEG2 transport stream are sequentially stored into the audio/video/system buffer 41. A header of each packet in the input MPEG2 transport stream contains packet-type information representing which of a video packet, an audio packet, and a system packet the present packet agrees with. The MPEG system decoder 1 detects which of a video packet, an audio packet, and a system packet each packet in the input MPEG2 transport stream agrees with by referring to packet-type information in the header thereof. The MPEG system decoder 1 extracts audio packets and system packets from the input MPEG2 transport stream according to results of the detection responsive to the packet-type information. The MPEG system decoder 1 feeds the audio packets and the system packets to an audio/system buffer (an audio/system memory) 5, and stores the audio packets and the system packets thereinto.

As understood from the above explanation, the audio packets and the system packets are stored into both the audio/system buffer 5 and the audio/video/system buffer 41. Thus, the audio packets and the system packets are doubled by cooperation between the MPEG system decoder 1 and the audio/system buffer 5.

The control circuit 3 generates a pair of a first write control signal and a first read control signal, and a pair of a second write control signal and a second read control signal in response to the packet-type information fed from the MPEG system decoder 1. The control circuit 3 outputs the pair of the first write control signal and the first read control signal to the audio/video/system buffer 41. The control circuit 3 outputs the pair of the second write control signal and the second read control signal to the audio/system buffer 5.

The writing of audio packets, video packets, and system packets into the audio/video/system buffer 41 is controlled by the first write control signal. The audio packets, the video packets, and the system packets are read out from the audio/video/system buffer 41 in response to the first read control signal. The writing of audio packets and system packets into the audio/system buffer 5 is controlled by the second write control signal. The audio packets and the system packets are read out from the audio/system buffer 5 in response to the second read control signal.

The recording side in FIG. 9 forms an array of tracks on a recording medium 42 while recording information thereon. The writing and reading of packets into and from the audio/video/system buffer 41, and the writing and reading of packets into and from the audio/system buffer 5 are designed so that a group of audio packets and a system packet will be recorded on each of specified tracks (audio/system tracks) spaced at equal track intervals, and a group of video packets, the audio packets, and the system packet will be recorded on other tracks (audio/video/system tracks).

Audio packets, video packets, and system packets read out from the audio/video/system buffer 41 are fed to an adding circuit 6. Audio packets and system packets read out from the audio/system buffer 5 are fed to the adding circuit 6. Time stamp information outputted from the timing detection circuit 2 is fed to the adding circuit 6. Dummy packets outputted from a dummy packet generator 80 are fed to the adding circuit 6. Video packets, audio packets, system packets, and dummy packets are fed to the adding circuit 6 one by one on a time division basis which corresponds to a sequence determined by given rules.

Figure 10:
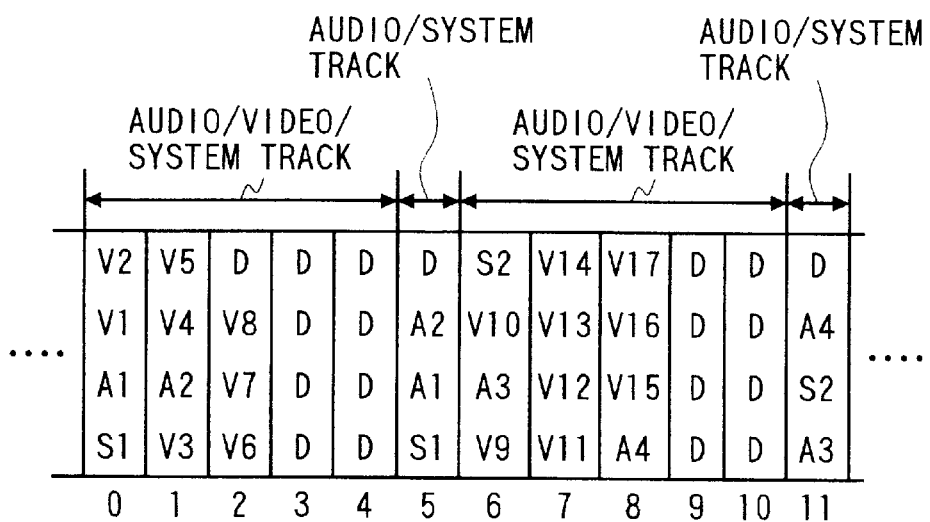
FIG. 10 is a diagram of an example of recorded packets and tracks on a recording medium in the second embodiment of this invention.

It is now assumed that as shown in FIG. 2, the input MPEG2 transport stream has a sequence of packets S1, A1, V1, V2, V3, A2, . . . . As previously explained, audio packets and system packets are doubled by the operation of the MPG system decoder 1 and the audio/system buffer 5. Then, video packets, the doubled audio packets, and the doubled system packets are recorded on recording-medium tracks "0", "1", "2", in a sequence as shown in FIG. 10. In FIG. 10, "D" denotes a dummy packet.

As shown in FIG. 10, preselected places or all places of every track are occupied by 4 recorded packets. In FIG. 10, tracks are separated into groups each having 6 successive tracks. Accordingly, the track groups have a period of 6 tracks. In each track group, 5 former tracks hold audio packets, video packets, and a system packet while a last track holds the audio packets and the system packet. Thus, audio packets and system packets are recorded on specified tracks (audio/system tracks) spaced by equal intervals of 5 tracks while the audio packets, the system packets, and video packets are recorded on other tracks (audio/video/system tracks) between the specified tracks.

As understood from FIGS. 2 and 10, audio packets, video packets, and a system packet inputted during every 6-track scanning period are recorded on audio/video/system tracks in a sequence which agrees with a packet arrival sequence. Also, audio tracks and a system track inputted during every 6-track scanning period are recorded on an audio/system track in a sequence which agrees with a packet arrival sequence. In each track group, places of audio/video/system tracks are sequentially loaded with a system packet, audio packets, and video packets. The control circuit 3 detects a final packet among the system packet, the audio packets, and the video packets in each track group by counting the number of times of the reception of the corresponding packet-type information. The control circuit 3 starts to periodically output a trigger pulse to the dummy packet generator 80 in response to the detection of the final packet. Therefore, in this case, places of the audio/video/system tracks, which follow a place recording the final packet among the system packet, the audio packets, and the video packets, are loaded with dummy packets. In each track group, places of an audio/system track are sequentially loaded with a system packet and audio packets. The control circuit 3 detects a final packet among the system packet and the audio packets in each track group by counting the number of times of the reception of the corresponding packet-type information. The control circuit 3 starts to periodically output a trigger pulse to the dummy packet generator 80 in response to the detection of the final packet. Therefore, in this case, places of the audio/system track, which follow a place recording the final packet among the system packet and the audio packets, are loaded with dummy packets.

With reference back to FIG. 9, the adding circuit 6 adds the time stamp information to the header of each of the video packets, the audio packets, and the system packets. The time-stamp-added video, audio, and system packets, and also the dummy packets are outputted from the adding circuit 6 to an outer-code generating circuit 7 one by one.

Figure 11:
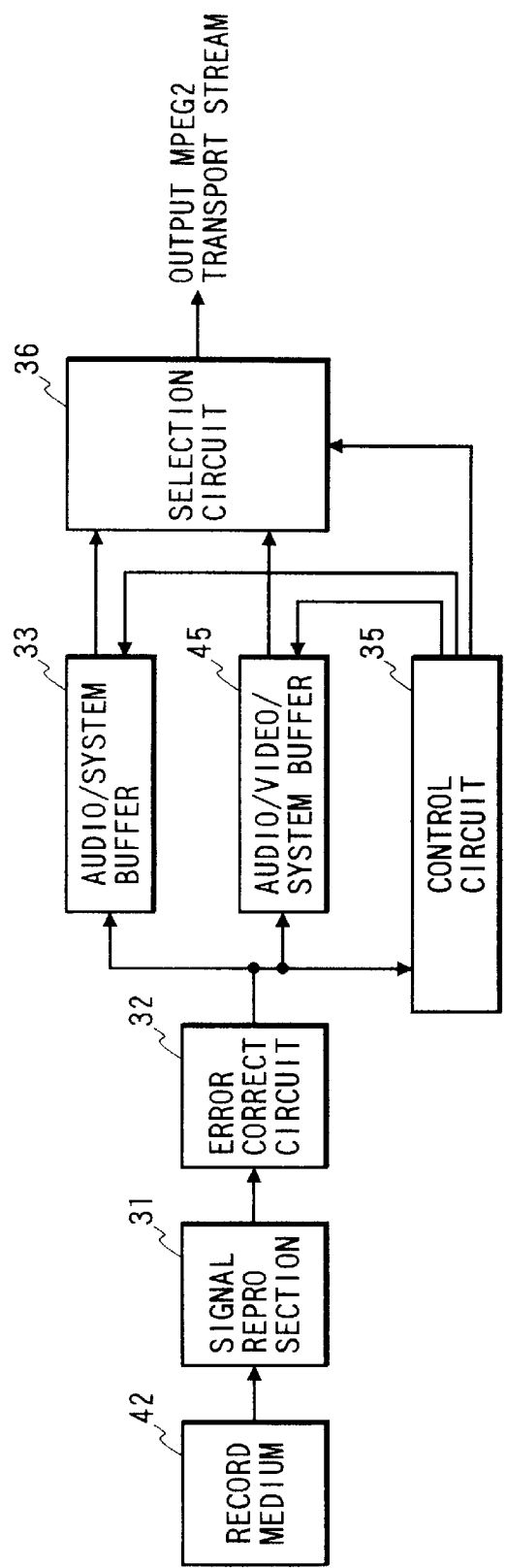
FIG. 11 is a block diagram of a reproducing side of the digital-signal recording and reproducing system according to the second embodiment of this invention.

FIG. 11 shows a reproducing side of the digital-signal recording and reproducing system according to the second embodiment of this invention. The reproducing side in FIG. 11 is similar to the reproducing side in FIG. 7 except for design changes indicated later. The reproducing side in FIG. 11 includes an audio/video/system buffer (an audio/video/system memory) 45 instead of the video/system buffer 34 in FIG. 7.

Operation of the reproducing side in FIG. 11 can be changed among plural different modes including a normal-speed playback mode and a high-speed playback mode. During the high-speed playback mode of operation of the reproducing side in FIG. 11, a rotary head assembly is changed from a normal state so that as shown in FIG. 8, audio/system tracks "A" and video/system tracks "B" spaced by equal intervals of two tracks can be fully scanned by a head or heads along longitudinal directions of the tracks.

During the high-speed playback mode of operation of the reproducing side in FIG. 11, an error-correction-resultant signal is outputted from an error correction circuit 32 to an audio/system buffer 33, the audio/video/system buffer 45, and a control circuit 35.

During the high-speed playback mode of operation of the reproducing side in FIG. 11, the control circuit 35 detects header information and time stamp information in each packet in the output signal of the error correction circuit 32. The control circuit 35 generates a pair of a first write control signal and a first read control signal, and a pair of a second write control signal and a second read control signal in response to the detected header information and the detected time stamp information. The control circuit 35 outputs the pair of the first write control signal and the first read control signal to the audio/system buffer 33. The control circuit 35 outputs the pair of the second write control signal and the second read control signal to the audio/video/system buffer 45. Audio packets and system packets in the output signal of the error correction circuit 32 which have been reproduced from audio/system tracks are written into the audio/system buffer 33 in response to the first write control signal. The audio packets and the system packets are read out from the audio/system buffer 33 in response to the first read control signal. The control of the audio/system buffer 33 by the control circuit 35 is designed so that the audio packets and the system packets will be read out from the audio/system buffer 33 in a sequence accorded with the packet arrival sequence retrieved from the time stamp information. Audio packets, video packets, and system packets in the output signal of the error correction circuit 32 which have been reproduced from scanned audio/video/system tracks are written into the audio/video/system buffer 45 in response to the second write control signal. The audio packets, the video packets, and the system packets are read out from the audio/video/system buffer 45 in response to the second read control signal. The control of the audio/video/system buffer 45 by the control circuit 35 is designed so that the audio packets, the video packets, and the system packets will be read out from the audio/video/system buffer 45 in a sequence accorded with the packet arrival sequence retrieved from the time stamp information.

During the high-speed playback mode of operation of the reproducing side in FIG. 11, the control circuit 35 generates a selection control signal in response to the detected header information and the detected time stamp information. The control circuit 35 outputs the selection control signal to a selection circuit 36. Audio packets and system packets read out from the audio/system buffer 33 are fed to the selection circuit 36. Audio packets, video packets, and system packets read out from the audio/video/system buffer 45 are fed to the selection circuit 36. The selection circuit 36 combines the audio packets, the system packets, and the video packets into an output MPEG2 transport stream of packets in response to the selection control signal. In this case, the output MPEG2 transport stream is designed to match with high-speed playback. The output MPEG2 transport stream is transmitted from the selection circuit 36.

During the normal-speed playback mode of operation of the reproducing side in FIG. 11, an error-correction-resultant signal is outputted from the error correction circuit 32 to the audio/system buffer 33, the audio/video/system buffer 45, and the control circuit 35.

During the normal-speed playback mode of operation of the reproducing side in FIG. 11, the control circuit 35 detects header information and time stamp information in each packet in the output signal of the error correction circuit 32. The control circuit 35 generates a pair of a first write control signal and a first read control signal, and a pair of a second write control signal and a second read control signal in response to the detected header information and the detected time stamp information. The control circuit 35 outputs the pair of the first write control signal and the first read control signal to the audio/system buffer 33. The control circuit 35 outputs the pair of the second write control signal and the second read control signal to the audio/video/system buffer 45. Audio packets and system packets in the output signal of the error correction circuit 32 which have been reproduced from audio/system tracks are written into the audio/system buffer 33 in response to the first write control signal. The audio packets and the system packets are read out from the audio/system buffer 33 in response to the first read control signal. The control of the audio/system buffer 33 by the control circuit 35 is designed so that the audio packets and the system packets will be read out from the audio/system buffer 33 in a sequence accorded with the packet arrival sequence retrieved from the time stamp information. Audio packets, video packets, and system packets in the output signal of the error correction circuit 32 which have been reproduced from audio/video/system tracks are written into the audio/video/system buffer 45 in response to the second write control signal. The audio packets, the video packets, and the system packets are read out from the audio/video/system buffer 45 in response to the second read control signal. The control of the audio/video/system buffer 45 by the control circuit 35 is designed so that the audio packets, the video packets, and the system packets will be read out from the audio/video/system buffer 45 in a sequence accorded with the packet arrival sequence retrieved from the time stamp information.

During the normal-speed playback mode of operation of the reproducing side in FIG. 11, the control circuit 35 generates a selection control signal in response to the detected header information and the detected time stamp information. The control circuit 35 outputs the selection control signal to the selection circuit 36. Audio packets and system packets read out from the audio/system buffer 33 are fed to the selection circuit 36. Audio packets, video packets, and system packets read out from the audio/video/system buffer 45 are fed to the selection circuit 36. The selection circuit 36 halving the audio packets and the system packets and arranges the audio packets, the system packets, and the video packets in an original sequence in response to the selection control signal, thereby providing an output MPEG2 transport stream of packets. In this case, the output MPEG2 transport stream is designed to match with normal-speed playback. The output MPEG2 transport stream is transmitted from the selection circuit 36.

During the normal-speed playback mode of operation of the reproducing side in FIG. 1, the audio/system buffer 33 may be held inactive by the control circuit 35, or the selection circuit 36 may be controlled by the control circuit 35 so as to continuously select the output signal of the audio/video/system buffer 45. In this case, the output MPEG2 transport stream is generated from only audio packets, video packets, and system packets which have been reproduced from audio/video/system tracks on the recording medium 42.

Other Embodiments

Each of the first and second embodiments may be modified in various ways as indicated later. According to a first modification, audio packets to be recorded on audio/system tracks are designed exclusive for high-speed playback. In this case, the audio packets to be recorded on the audio/system tracks are generated by decoding audio packets for normal-speed playback and then encoding the decoding-resultant data into a high-speed playback version.

According to a second modification, a high-speed playback mode of operation of a reproducing side is of different types corresponding to different reproduction speeds respectively. In this case, different types of data in audio packets are prepared by a recording side for the high-speed playback types respectively. Data in audio packets for m-time speed playback is generated by thinning out original audio packet data at a rate of 1/m. For example, triple-speed playback audio packets A1, A2, A3, A10, A11, A12, A19, A20, A21, . . . are generated by removing audio packets A4, A5, A6, A7, A8, A9, A13, A14, A15, A16, A17, A18, . . . from an original sequence of audio packets A1, A2, A3, A4, A5, A6, A7, A8, A9, A10, A11, A12, A13, A14, A15, A16, A17, A18, A19, A20, A21 . . . . The thinning process is implemented by periodically suspending the writing of audio packets into the audio/system buffer 5 (see FIGS. 1 and 9).

According to a third modification, during high-speed playback mode of operation of a reproducing side, audio packets reproduced from audio/system tracks on a recording medium 10 or 42 (see FIG. 7 or 11) are thinned out at a rate depending on the reproduction speed. The thinning process is implemented by periodically suspending the writing of audio packets into the audio/system buffer 33 (see FIGS. 7 and 11). For example, during m-time speed playback, audio packets are thinned out at a rate of 1/m.

A fourth modification is designed to handle an input sequence of packets including audio packets exclusively for high-speed playback. In the fourth modification, the high-speed playback audio packets are recorded on audio/system tracks on a recording medium 10 or 42 (see FIGS. 1 and 7). The fourth modification includes a device for discriminating the high-speed playback audio packets from other packets.

What is claimed is:

1. A method comprising the steps of:

separating audio packets from an input stream of packets including audio packets and video packets, the audio packets relating to audio information, the video packets relating to video information;

separating the video packets from the input stream of packets;

recording the separated audio packets on first tracks among an array of tracks on a recording medium, the first tracks being spaced by equal intervals corresponding to a given number of tracks;

recording the separated video packets on second tracks among the array of tracks on the recording medium, the second tracks differing from the first tracks;

scanning the first tracks and reproducing the audio packets from the first tracks during high-speed playback; and generating an output stream of packets in response to the reproduced audio packets during the high-speed playback.

2. A method comprising the steps of:

separating audio packets from an input stream of packets including audio packets and video packets, the audio packets relating to audio information, the video packets relating to video information;

recording the separated audio packets on first areas of a recording medium;

recording the input stream of packets including the audio packets and the video packets on second areas of the recording medium, the second areas alternating with the first areas;

scanning the second areas and reproducing the audio packets and the video packets from the second areas during normal-speed playback;

generating an output stream of packets in response to the audio packets and the video packets reproduced from the second areas during the normal-speed playback;

scanning the first areas and reproducing the audio packets from the first areas during high-speed playback; and generating an output stream of packets in response to the audio packets reproduced from the first areas during the high-speed playback.

3. A method as recited in claim 2, wherein the audio packets recorded on the first areas include audio data resulting from thinning out original audio data at a rate depending on a reproduction speed provided by the high-speed playback.

4. A method as recited in claim 2, wherein the audio packets recorded on the first areas include audio data resulting from decoding original audio packets into decoding-resultant audio packets and then encoding the decoding-resultant audio packets into a version suited for the high-speed playback.

5. A method as recited in claim 1, wherein the output-stream generating step comprises:

thinning out the reproduced audio packets into thinning-resultant audio packets at a rate depending on a reproduction speed provided by the high-speed playback; and generating the output stream of packets in response to the thinning-resultant audio packets during the high-speed playback.

6. A recording and reproducing apparatus comprising:

first means for separating audio packets from an input stream of packets including audio packets and video packets, the audio packets relating to audio information, the video packets relating to video information;

second means for separating the video packets from the input stream of packets;

third means for recording the audio packets separated by the first means on first tracks among an array of tracks on a recording medium, the first tracks being separated by equal intervals corresponding to a given number of tracks;

fourth means for recording the video packets separated by the second means on second tracks among the array of tracks on the recording medium, the second tracks differing from the first tracks;

fifth means for scanning the first tracks and reproducing the audio packets from the first tracks during high-speed playback; and sixth means for generating an output stream of packets in response to the audio packets reproduced by the fifth means during the high-speed playback.

7. A recording and reproducing apparatus comprising:

first means for separating audio packets from an input stream of packets including audio packets and video packets, the audio packets relating to audio information, the video packets relating to video information;

second means for recording the audio packets separated by the first means on first areas of a recording medium;

third means for recording the input stream of packets including the audio packets and the video packets on second areas of the recording medium, the second areas alternating with the first areas;

fourth means for scanning the second areas and reproducing the audio packets and the video packets from the second areas during normal-speed playback;

fifth means for generating an output stream of packets in response to the audio packets and the video packets reproduced from the second areas by the fourth means during the normal-speed playback;

sixth means for scanning the first areas and reproducing the audio packets from the first areas during high-speed playback; and seventh means for generating an output stream of packets in response to the audio packets reproduced from the first areas by the sixth means during the high-speed playback.

\* \* \* \* \*